April 7, 1964     J. L. HEMERY     3,127,755
FROZEN FOOD STORAGE AND CONVEYANCE MEANS
Filed March 16, 1962     2 Sheets-Sheet 1

INVENTOR.
Jack L. Hemery
BY
Ooms, McDougall & Hersh
Attys

April 7, 1964 J. L. HEMERY 3,127,755
FROZEN FOOD STORAGE AND CONVEYANCE MEANS
Filed March 16, 1962 2 Sheets-Sheet 2

INVENTOR.
Jack L. Hemery
BY
Ooms, McDougall and Hersh
Att'ys

3,127,755
**FROZEN FOOD STORAGE AND
CONVEYANCE MEANS**
Jack L. Hemery, Des Plaines, Ill., assignor to Continental
Freezers of Illinois, Division of F. H. Prince Co., Inc.,
Chicago, Ill., a corporation of Delaware
Filed Mar. 16, 1962, Ser. No. 180,161
4 Claims. (Cl. 62—267)

This invention relates to the storage and transportation of refrigerated and preferably frozen foods and more particularly to a storage and conveying means for frozen foods wherein it is desirable to maintain the storage space at a low temperature for maintenance of the frozen foods in a safe and frozen state.

While this invention will be described with reference to the problems of transportation of frozen foods in the van of a truck for delivery from the freezing plant or to or from frozen storage or to various retail outlets for distribution or sale, it will be understood that the concepts which will hereinafter be described will have application to other facilities for the storage and transportation of refrigerated goods, as well as frozen foods or other frozen goods, as in railroad cars or the like.

In the transportation of frozen foods from the freezer plant or from frozen storage, it is desirable to maintain the food at a temperature below about 0° F., otherwise deterioration or spoilage may occur thereby to depreciate the saleability or the value of the product.

Trucks which have been designed for the transportation of frozen foods make use of a conventional refrigeration system including a separately driven compressor, a condenser, an evaporator and heat exchanger located externally of the storage space for the refrigeration of air which is directly introduced in the refrigerated state into the storage space for purposes of maintaining the food at low temperature. The use of refrigerated air for maintaining the refrigerated state within the refrigerated space poses a number of problems and limitations which militates against the most efficient utilization of the space and which obstructs uniform temperature distribution throughout the space whereby portions are permitted to rise to temperatures above the safe storage temperature for the frozen foods. The circulation of refrigerated air through the refrigerated space also imposes other limitations in the construction and operation of the delivery means such as requires utilization of special facilities in the truck.

For example, in order to permit circulation of the refrigerated air through the refrigerated space, it has been found desirable incompletely to fill the space with the packages of frozen foods so that space will remain adjacent the ceiling of the refrigerated space and so that channels can be provided between the packages for the free flow and circulation of the refrigerated air. Thus the storage space is only partially filled with the frozen food packages with sufficient space being left at the top for the flow of air over the entire area.

By way of still further example, the necessity to provide air channels for free circulation of the cold air requires the use of special racks for lining the side and end walls of the interior of the storage space and on the floor to insure an air space through which the cold air can be circulated in the attempt to achieve some degree of uniformity in refrigeration about the refrigerated space. Such racks occupy additional space which otherwise would be available for the storage of goods and the use of such racks requires special handling which many of the truck drivers are reluctant to give with the result that such racks are often omitted or else improperly managed with the result that improper refrigeration is often developed or else special trips or special precautions are required to be taken to insure the proper usage of such racks.

Still further, the frozen food packages in themselves often form barriers to recirculation of cold air with the result that some portions of the cargo remain at the desired low temperature while others which are less accessible to the refrigerated air rise in temperature sometimes to a level which is no longer safe for the frozen foods.

The foregoing are but some of the problems arising other than the need for specialized equipment and labor as well as refrigeration equipment of high cost and capacity for maintaining the refrigerated state.

Thus it is an object of this invention to produce a facility for the storage and transportation of frozen goods in a manner which overcomes many, if not all, of the objectionable features of the type previously pointed out.

More specifically, it is an object of this invention to produce a delivery truck for the storage and transportation of frozen foods wherein fuller utilization can be made of the available storage space for housing the packages of frozen foods; which insures more uniform temperature distribution throughout the storage space; which does not require racks or special facilities or attachments which occupy storage space; which is simple in construction and easy in operation; which is less expensive to operate than present refrigeration systems, and which is capable of maintaining a safe, cold temperature within the storage space.

These and other objects and advantages of this invention will hereinafter appear and for purposes of illustration, but not of limitation, an embodiment of the invention is shown in the accompanying drawings in which—

Figure 1:
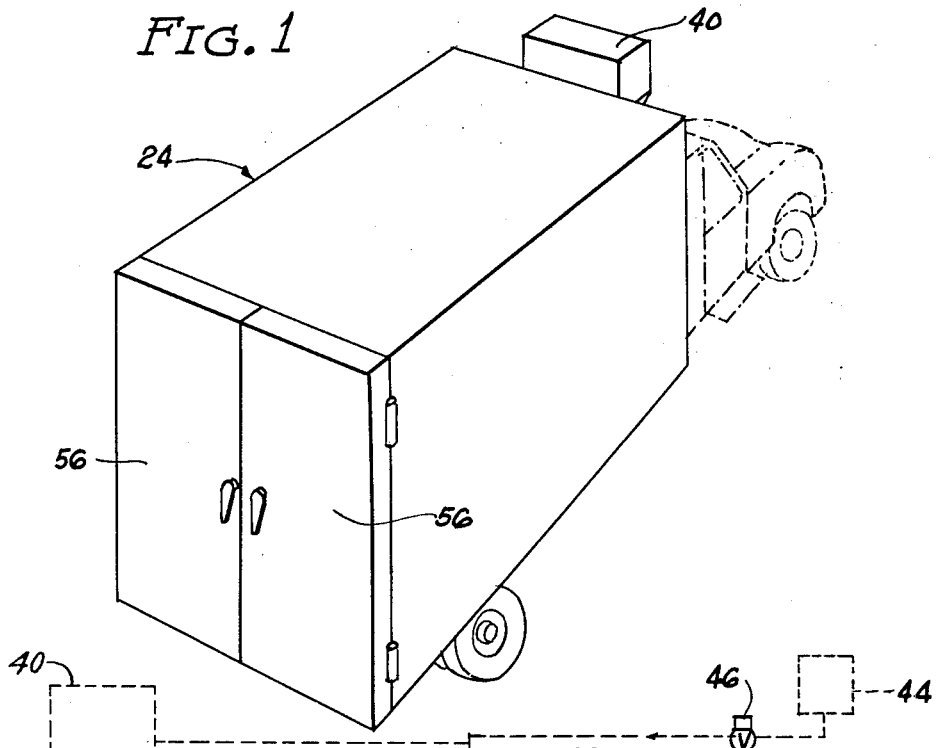
FIG. 1 is a schematic view of a refrigerated transportation truck embodying the features of this invention.

The concepts of this invention reside in the fuller utilization of the storage space for the storage of frozen food packages and the reliance on means externally of the storage space to block heat flow from the ambient atmosphere into the storage space whereby the frozen state is maintained within the storage space without the necessity for the circulation of refrigerated air therethrough.

For this purpose, the transportation means is provided with a storage space 10 which is surrounded by a refrigeration channel 12 separated from the storage space 10 by a relatively thin and relatively impervious inner wall or skin 14 of a high strength material which is preferably characterized by a high heat transfer coefficient. The refrigeration channel 12 is in turn surrounded by an insulation space 16 separated from the refrigeration channel by an outer wall 18 of a relatively impervious and high strength material to define an open refrigerated space separated by impervious walls 18 and 14 from the inner storage space 10. The insulation space is adapted to be filled with a material 20 characterized by low heat transfer characteristics, such as foamed plastic, represented by foamed polystyrene, foamed polyurethane and the like, diatomaceous earth, perlite, balsawood, or the like. The insulated space is protected by the outer skin 22 of the truck body 24.

The inner and outer walls 14 and 18, which between them define the open channel 12 through which refrigeration is freshly circulated to protect the entire storage space from heat leaks and which operates also to introduce refrigeration into the refrigerated space 10 by direct heat transfer through the inner wall 14, can be formed of thin sheets of aluminum, steel, stainless steel or the like metal of high strength and high heat transfer coefficient. In a conventional delivery truck having a body height of 13 feet from the ground and a width of about 96 inches, the channel 12 defined between the inner and outer walls 14 and 18 may range from 1 to 5 inches, and preferably about 2 to 3 inches. Similarly, it is sufficient to form the insulation section to a thickness of from 2 to 6 inches of insulation but it is preferred to make use of an insulation of about 2 to 4 inches in thickness when formed of a foamed-in-place or blown-in polyurethane or glass wool mats.

The floor plate 26 is supported on spaced beams 28 such as I beams, arranged either lengthwise or crosswise of the truck body 24 with the beams 28 being supported, in turn, on the bottom support 30 which may form a part of the truck bottom frame 31 or which may be separated from the frame by an insulation section as in the portion surrounding the top, side and end walls of the refrigerated cargo space.

In this construction, the space between the floor 26 and the supporting wall 30 represents a refrigeration channel 32 through which the refrigerating medium is circulated to block heat flow through the bottom wall into the insulated space. It operates additionally to reduce refrigeration loss through the inner wall into the refrigerated space. When the beams 28 extend continuously from one edge to the other within said space, the beams are formed with crosswise extending passages 34 to communicate the space into which the channel 32 is subdivided by the beams. Thus, the refrigeration medium can flow into the channel 32 and through the beams 28 across the bottom wall surrounding the refrigerated cargo space 10.

In the preferred practice, the center beam can be formed without the crosswise communicating passages to function as a barrier to the flow of refrigeration medium or else a bulkhead can be provided to extend centrally across the channel for purposes of subdividing the channel whereby the portions on each side of the blocking member 36 would be provided with outlets 38 for the removal of the refrigerating medium from the refrigeration channels.

The circulation of the refrigeration medium through the refrigeration channels 12 and 32 can be controlled, depending upon the means employed for refrigeration.

When, for example, use is made of air refrigerated to the desired low temperature by conventional refrigeration means, illustrated by the numeral 40, the cold air can be introduced into the channels through one and preferably a plurality of longitudinally spaced apart inlets 42 arranged along the center of the top wall for flow of the cold refrigerated air lengthwise and crosswise across the top channel 12 and down the side and end wall channels into the opposite ends of the bottom channel 32 and then to the outlets 38 located on each side of the central barrier 36. The refrigerated air exhausted from the outlets 38 can be released to the atmosphere. In the preferred practice, the refrigerated air issuing from the outlets 38, which air will still contain a considerable amount of invested refrigeration, can be recirculated through line 43 to the refrigeration means, illustrated diagrammatically by the numeral 40 (FIGURE 2), for reduction in temperature and return to the inlets 42 for recirculation.

Instead of making use of refrigerated air as the refrigeration medium, use can be made of a refrigerated liquid which is capable of fluid flow at the cold temperatures to which it is cooled for circulation through the refrigeration channels 32 and 12. In such instance, the refrigerated fluid is introduced through the ports 38 at the bottom for lateral flow through the refrigeration channel 32 and into the side and end channels 12 to the ports 42 at the top for return of the fluid to the refrigeration means for recycling. Under such circumstances, it is desirable to insure that the channels 32 and 12 are fluid tight in order to limit flow of the refrigeration fluid therethrough whereby the fluid can carry away heat which otherwise penetrates from the ambient atmosphere to the refrigerated space and whereby also the inner wall 14 may function as a heat exchanger for the introduction of cold from the refrigeration fluid into the refrigerated space.

In a preferred concept of this invention, use is made of a cold liquefied gas as a refrigerant, as represented by liquefied air, liquefied nitrogen and the like material, having a boiling point at atmospheric pressure which is at a temperature considerably below 0° F. Under such circumstances, the inner wall 14 functions not only as a heat exchanger but also as an evaporator plate adapted to be contacted by the liquefied gas introduced through the inlets 42 or by separate spray heads spaced crosswise and lengthwise over the top, side and end channels to direct the liquefied gas onto the surfaces of the evaporator plates. The low boiling liquid thus introduced into the refrigeration channels is converted into a gas at the boiling point temperature of the liquid which will be at a temperature below −300° F. for liquefied air or liquefied nitrogen. The cold gas released by the liquid will circulate through the channels 12 and 32 to carry away heat loss from the ambient atmosphere and to reduce the temperature of the wall 14 whereby the latter functions as a heat exchanger to introduce cold into the refrigerated space.

Figure 2:
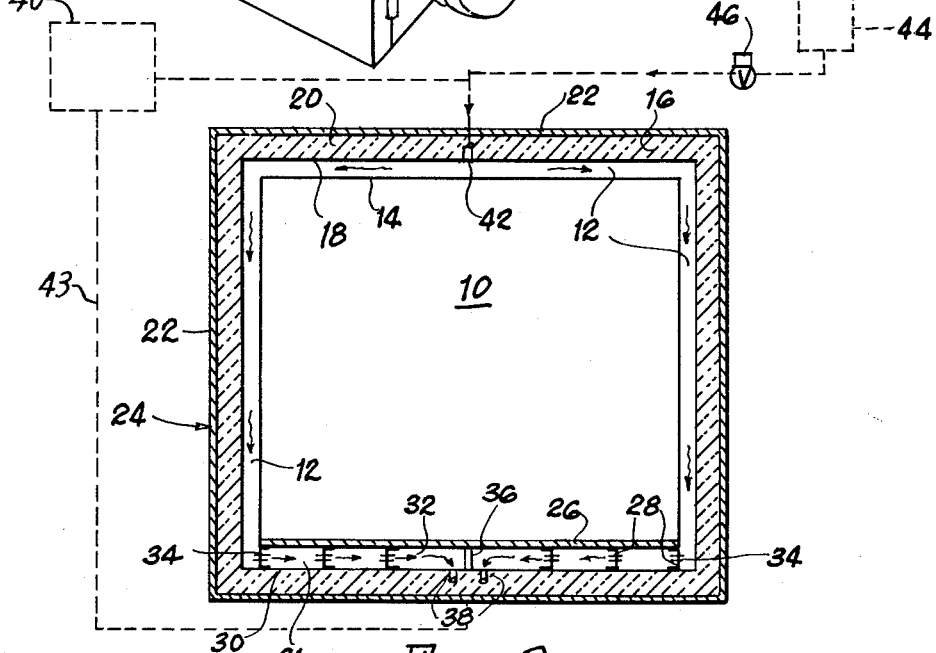
FIG. 2 is a schematic sectional elevational view of the body of a truck embodying the features of this invention.

FIGURE 2 also illustrates this alternative wherein the liquefied gas is housed in an insulated reservoir 44 having one or more passages communicating with the inlets 42 to the refrigeration channels and wherein the passages are preferably provided with valve means 46 for controlling the flow of liquid in response to the temperature conditions existing within the refrigeration channels or, in the alternative, in the refrigerated space, to signal the demand for refrigeration and thereby maintain the temperature within the refrigerated space at a uniformly desirable low level. The feed of liquefied gas into the refrigeration channels can also be made responsive to the opening and closing of the doors for access to the refrigerated space for the purpose of introducing or removing frozen food packages thereby to supply refrigeration at the time when greatest heat loss from the refrigerated space might occur. Under such circumstances, variation in temperature within the refrigerated space is held to a minimum and the desired state of refrigeration can be maintained.

When use is made of a liquefied gas for introduction into the refrigeration channels, it is desirable to make use of walls 14 and 18 formed of a material which does not lose its strength or ductility at the low temperatures of the liquefied gas. For such purpose, use can be made of walls formed of aluminum, stainless steel, high nickel steels or other austenitic steels.

Figure 3:
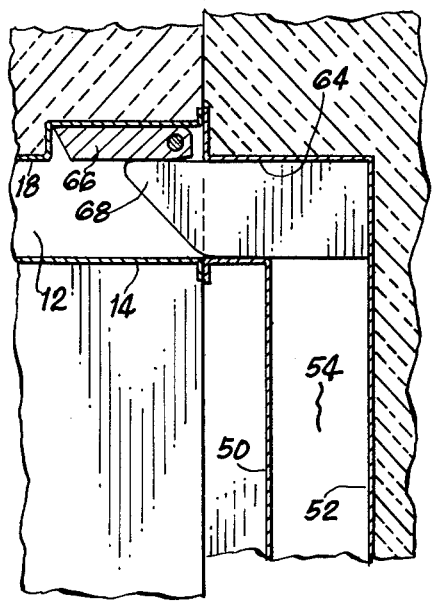
FIG. 3 is a schematic sectional elevational view lengthwise through the refrigerated body showing the door in closed position.
Figure 4:
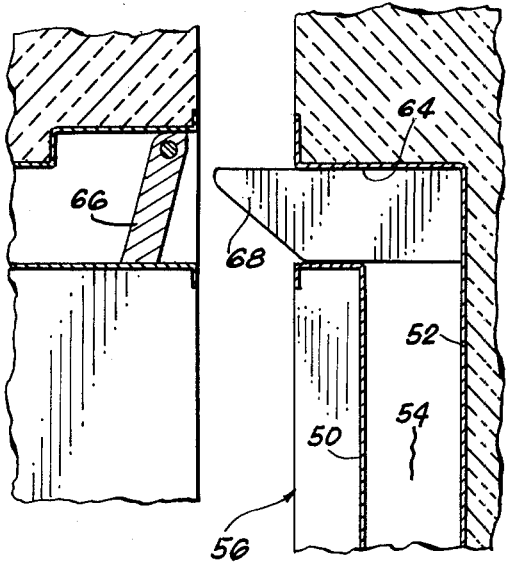
FIG. 4 is a sectional view similar to that of FIG. 3 showing the rear access door in open position.
Figure 4:
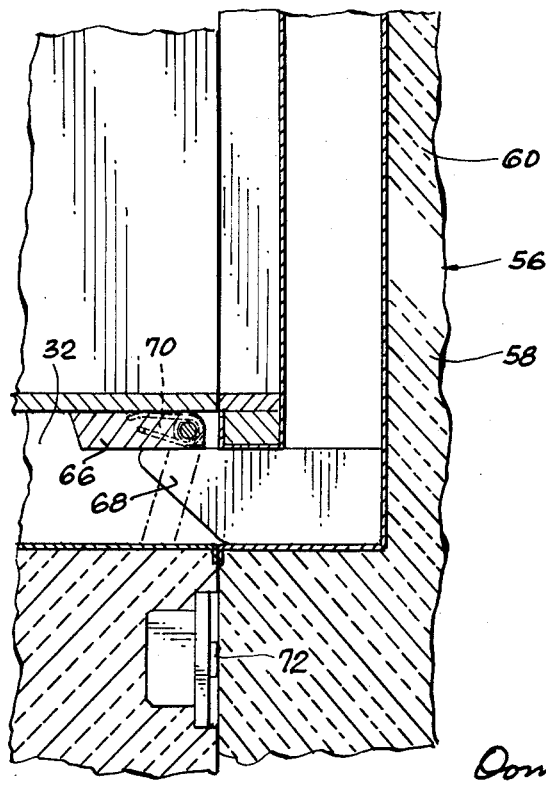

Means are also provided for circulation of the refrigerating medium through channels in the door which are usually provided at the rear of the truck or in the side walls for gaining access to the interior thereof. It is desirable to provide means for enabling the refrigerating medium to be circulated through the door channel to minimize heat loss while the door is closed but to cut off the circulation of the refrigerating medium while the door is open. For this purpose, the door is provided with a cross-section similar to that of the cross-section described in the side and end walls, namely, an inner skin 50 and a spaced outer skin 52 which between them define the channel 54 through which the refrigerating medium is circulated. Between the outer skin 52 and the outer door panel 56, the space 58 is adapted to be filled with thermal insulating material 60. The refrigerating channel which is sealed at its lateral edges by panel 62 extends vertically between communicating horizontally disposed short channel sections 64 which are lengthwise aligned with the roof and floor channels in the body portion of the truck for establishing direct communication at any time when the door is closed. A shutter plate 66 is provided in the upper and lower refrigerating channels adjacent the door opening and means are provided for displacement of said shutter plate between blocking and unblocking positions responsive to opening and closing of the doors respectively. Such movement between blocking and unblocking positions can be achieved by electronic controls with solenoid operation or it can be achieved mechanically, as illustrated in FIGS. 3 and 4, wherein the shutter plates 66 are suspended from their upper edges for rocking movement and wherein the shutter plates are adapted to block the entire cross-section of the refrigerating channels when rocked downwardly to blocking position. The door 56 can be provided with an actuating arm 68 rigid with the door and positioned positively to engage the shutter plate in the path thereof for rocking movement of the shutter to unblocking position in response to closing the door and to enable the shutter plate to be rocked to blocking position in response to movement of the door from closed position. Reliance can be had on gravitational forces to effect such rocking movement from unblocking to blocking position or use can be made of springs or other resilient means 70 constantly urging the shutter plate toward blocking position.

For most effective refrigeration, it is desirable to cut off the flow of refrigerating medium through the refrigerating channels while the door is open and immediately to initiate flow upon closing of the door. This can be achieved by the use of conventional electro-mechanical controls such as a switch button 72 lying in the path of the door to make the switch when the door is closed and to open the switch when the door is opened. The refrigeration system can be made responsive to the switch to cut off flow of refrigerating medium when the switch is open and to re-initiate flow of refrigerating medium through the refrigerating channels when the door is closed. Thus refrigeration is not introduced during the period of time that the door is open but refrigeration is resumed when most effective utilization can be made thereof to refrigerate the storage space and prevent heat loss.

It is not necessary to insure gas tightness in the refrigeration channels when liquefied air or liquefied nitrogen is employed as the refrigerating medium since the gases released by the liquid are inert and it is most economical to vent the gases from the outlets 38 into the atmosphere. Liquefied gases, such as liquefied nitrogen, are readily available at low cost since it is a by-product of the production of liquefied oxygen employed in large quantities by the steel industry.

It will be apparent from the foregoing that I have provided a new and improved concept for the safe storage and transportation of frozen foods and other frozen products while in a frozen state. The described means and method is not subject to the limitations imposed by systems previously employed in that the entire space available in the storage compartment can be employed for the housing of frozen foods and the like packages without interfering with the maintenance of the desired state of refrigeration in all sections of the cargo space.

It will be evident also that the described means for preventing heat flow through the walls defining the refrigerated space requires less utilization of space for purposes of maintaining the refrigerated state. As a result, more efficient use can be made of the storage and transportation means and use can be made of such refrigerated storage and transportation means without the need for adopting special racks or tackle for loading or unloading the frozen food packages.

The concepts described also provide for less loss of refrigeration responsive to the opening and closing of the doors for access to the refrigerated space since refrigeration of the space does not depend upon the circulation of refrigerated air therethrough whereby out-flow of cold and the in-flow of heat is maximized when the door is opened for access to the interior. Instead, the refrigeration is separated from the refrigerated space so that the opening and closing of the doors for access to the refrigerated space will have minimum effect on the state of refrigeration. Further, the amount of refrigeration can be automatically increased in response to the opening and closing of the doors thereby immediately to compensate for heat loss.

It will be understood that changes may be made in the details of construction, arrangement and operation, without departing from the spirit of the invention, especially as defined in the following claims.

I claim:

1. A storage and transportation means for frozen and refrigerated foods comprising an enclosure for housing packages of frozen foods, a refrigeration passage surrounding the enclosure and separated therefrom by a wall formed of a material having a high heat transfer coefficient, a floor forming part of said wall at the bottom of the enclosure, a plurality of supporting beams extending in spaced-apart relation through the refrigeration passage adjacent said floor to support the floor and subdivide the passage into sections, said beams being formed with crosswise extending openings for communicating said sections to enable flow of refrigeration medium therethrough, a bulkhead extending along the central portion of said floor to subdivide the passage adjacent the floor and to close off communication between portions thereof, an inlet in communication with said refrigeration passage at one end of said enclosure and outlets in communication with said refrigeration passage at another end remote from said inlet, an insulation space surrounding at least the top, bottom, side and ends of said refrigeration passage and separated therefrom by a substantially fluid and vapor impervious wall, a thermal insulating material within said insulation space, a protective outer shell of a structurally strong material enclosing said insulation space, refrigeration passage and enclosure, and means for feeding refrigeration medium to the inlet of said refrigeration passage for circulation through said refrigeration passage to the outlet to block heat loss from the ambient atmosphere to the enclosure and for transmission of refrigeration to the enclosure through the separating wall, and wherein said outlets communicate with the bottom of the refrigeration passage adjacent said bulkhead whereby refrigeration medium flows from the top to the bottom through said refrigeration passages and across the bottom to the outlets.

2. A storage and transportation means as claimed in claim 1 in which the wall separating the enclosure from the refrigeration passage comprises a fluid and vapor impervious wall which is formed of a material that retains its strength and ductility at extremely low temperature and in which the refrigeration medium comprises a liquefied gas.

3. A storage and transportation means as claimed in claim 1 which includes refrigeration means and in which the exhaust from the outlets of the refrigeration passage is passed through said refrigeration means and returned to the inlet for said refrigeration passage for recirculation of the cooled refrigeration medium through the refrigeration passages.

4. A storage and transportation means for frozen and refrigerated foods comprising an enclosure for housing packages of frozen foods, a refrigeration passage surrounding the enclosure and separated therefrom by a wall formed of a material having a high heat transfer coefficient, a floor forming part of said wall at the bottom of the enclosure, a plurality of supporting beams extending in spaced-apart relation through the refrigeration passage adjacent said floor to support the floor and subdivide the passage into sections, said beams being formed with crosswise extending openings for communicating said sections to enable flow of refrigeration medium therethrough, a bulkhead extending along the central portion of said floor to subdivide the passage adjacent the floor and to close off communication between portions thereof, an inlet in communication with said refrigeration passage at one end of said enclosure and outlets in communication with said refrigeration passage at another end remote from said inlet, an insulation space surrounding at least the top, bottom, side and ends of said refrigeration passage and separated therefrom by a substantially fluid and vapor impervious wall, a thermal insulating material within said insulation space, a protective outer shell of a structurally strong material enclosing said insulation space, refrigeration passage and enclosure, and means for feeding refrigeration medium to the inlet of said refrigeration passage for circulation through said refrigeration passage to the outlets to block heat loss from the ambient atmosphere to the enclosure and for transmission of refrigeration to the enclosure through the separating wall, said enclosure also including a door, refrigeration passage means defined by said door and adapted to communicate with the first mentioned refrigeration passage means, shutter elements, and means operating said shutter elements responsive to the opening and closing of said door for respectively shutting off and opening communication between the first mentioned refrigeration passage and the refrigeration passage for said door.

References Cited in the file of this patent

UNITED STATES PATENTS

| | | |
|---|---|---|
| 1,752,015 | Martin | Mar. 25, 1930 |
| 2,246,342 | Brown | June 17, 1941 |
| 2,247,850 | Rayburn | July 1, 1941 |
| 2,479,840 | Johnson et al. | Aug. 23, 1949 |
| 2,566,301 | Albert | Sept. 4, 1951 |
| 2,660,036 | Moore | Nov. 24, 1953 |
| 2,881,600 | Elfving | Apr. 14, 1953 |
| 2,882,701 | Nelson et al. | Apr. 21, 1959 |

FOREIGN PATENTS

| | | |
|---|---|---|
| 971,473 | Germany | Feb. 5, 1959 |